March 19, 1935. R. G. HAZZARD 1,994,645
AUTOMATIC WEATHER STRIP
Filed Dec. 16, 1933
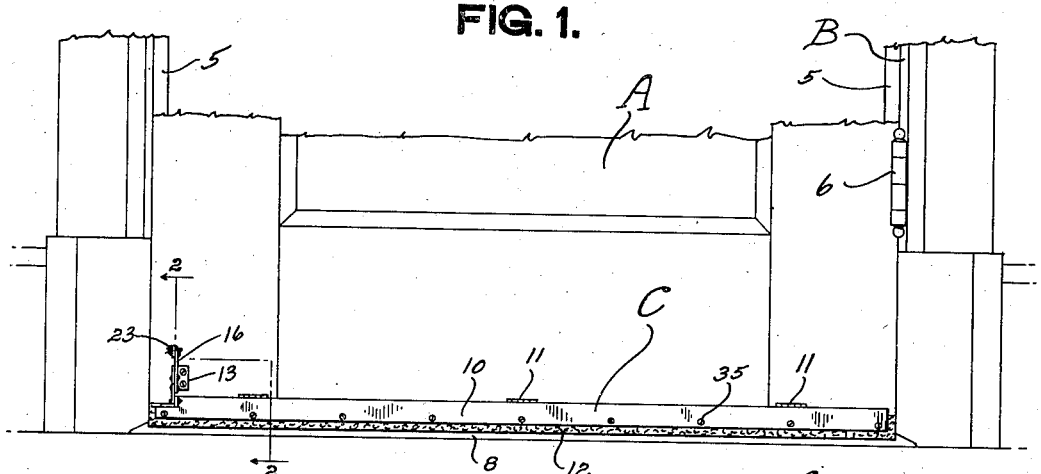
FIG. 1.
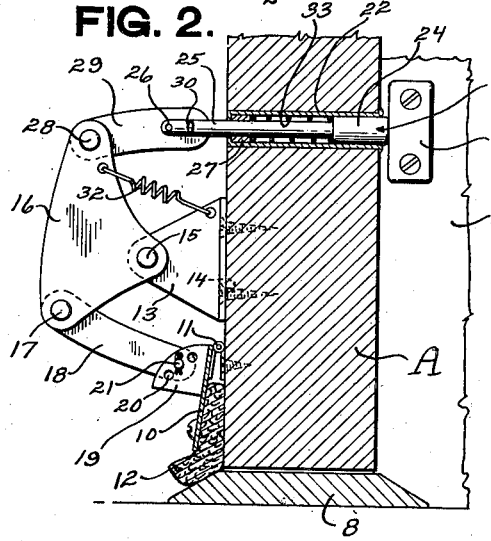
FIG. 2.
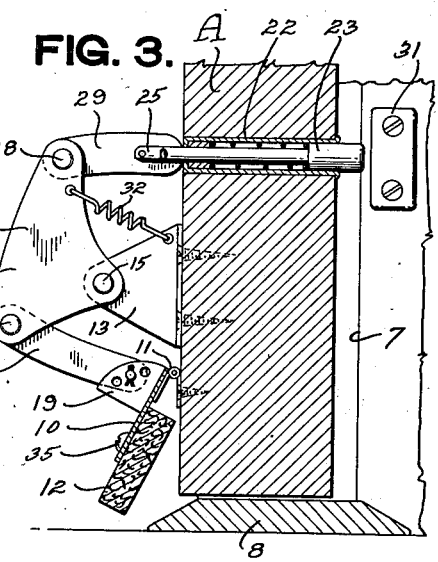
FIG. 3.
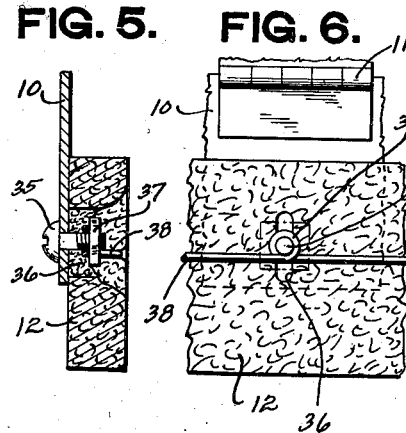
FIG. 5. FIG. 6. FIG. 7.
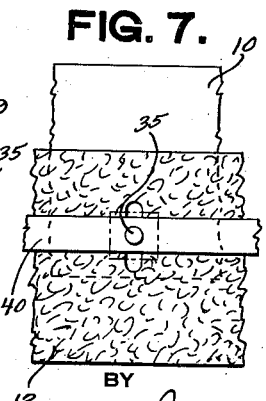
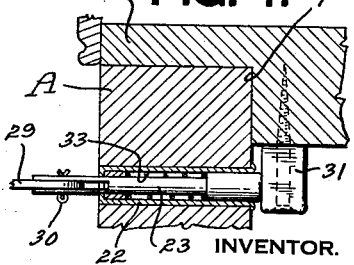
FIG. 4.
INVENTOR.
Richard G. Hazzard
BY
ATTORNEYS.

Patented Mar. 19, 1935

1,994,645

UNITED STATES PATENT OFFICE 1,994,645

AUTOMATIC WEATHER STRIP

Richard G. Hazzard, Grand Rapids, Minn.

Application December 16, 1933, Serial No. 702,800

5 Claims. (Cl. 20—67)

The present invention relates to automatic weather stripping for doors and the like and the primary object of the invention is to provide an automatic weather strip operated by opening and closing of the door to completely close all openings under the door when the door is closed, and when the door is opened, to automatically raise the sealing element and prevent rubbing during opening or closing of the door.

A further object of the invention is to provide an automatic weather strip for the lower portion of swinging doors embodying an adjustable sealing element or strip which may be adjusted into contact with uneven floors whereby the opening beneath the door will be completely sealed when the door is closed.

A further object of the invention is to provide automatic weather stripping means for closing the opening at the bottom of either inside or outside doors and embodying a pivoted sealing element or strip automatically raised from a sealing position upon slight opening movement of the door and movable to a sealing position just prior to final closing movement of the door.

A further object of the invention is to provide a swinging, automatically operated weather strip which when swung to a sealing position provides a seal along the face of the door as well as between the door and floor or threshold.

A still further and important object of the invention is to provide an automatic weather strip of this character which may be attached to either right or left swinging doors, one which is small, compact and neat in appearance, and which may be easily installed without defacing the door to any objectionable extent.

A still further object resides in the manner of securing the flexible sealing strip in an adjustable manner upon its carrier strip.

Other objects and advantages of the invention will be apparent from the following detailed description, taken in connection with the accompanying drawing forming a part of this specification and in which drawing:—

Figure 1 is a plan view of the lower portion of a door shown in a closed position and provided with the automatic weather strip for closing whatever space exists between the bottom edge of the door and the floor.

Figure 2 is an enlarged fragmentary section on the line 2—2 of Figure 1 and showing the position of the weather strip and its actuating means when the door is closed.

Figure 3 is a fragmentary sectional view substantially similar to Figure 2 but showing the weather strip raised upon initial opening movement of the door.

Figure 4 is a fragmentary horizontal section thru the door at the plunger of the weather strip actuating means, the door being shown in a closed position.

Figure 5 is an enlarged transverse section thru the sealing or weather strip and its carrier and showing the manner of adjustably securing the strip to the carrier.

Figure 6 is a fragmentary plan view of the weather strip and its carrier.

Figure 7 is a view showing a modified form of retaining means for the weather strip.

Referring to the drawing in detail and wherein similar reference characters designate corresponding parts thruout the several views, the letter A designates a door mounted in the frame B, the door being sealed along its lower edge by the automatic weather strip designated by the letter C. In the example shown, the door frame A embodies the jambs 5 to one of which the door A is hinged as at 6. The jambs 5 are rabbeted as usual providing a stop shoulder 7 against one of which the free or swinging edge of the door abuts when closed. In some types of door frames, a stop strip is placed along each face of the jambs to provide the stop shoulders 7 providing a stop for the door. Extended between the lower ends of the jambs 5 is the threshold or sill 8 above which the door is disposed when in a closed position in the door frame. In some instances and particularly in cases of inside doors, the sill 8 is dispensed with so that the flooring continues unbroken thru the doorway. The automatic weather strip is equally applicable to doorways provided either with or without a sill.

The weather strip C may be applied to either inside or outside doors and is automatically controlled by swinging movement of the door to fully close any clearance space below the door when closed. The device C comprises a metal carrier strip or bar 10 pivotally connected at its upper edge to one face of the lower portion of the door A as by suitable hinges 11 which may have one leaf secured as by welding or riveting to the carrier strip and the other leaves secured to the door as by small screws or other fastening elements as clearly shown in Figures 2 and 3. Adjustably secured along the inner face of the pivoted carrier strip 10 is a sealing element 12 in the form of a strip of flexible material such as felt, rubber or the like and which strip extends below the lower or free edge of the carrier strip. The metal carrier strip 10 has a length slightly less than the width of the door A and the ends of the sealing strip 12 project beyond the ends of the carrier strip for an extent so as to contact the door frame when the door is closed.

Referring now to the means for automatically actuating the sealing means upon opening and closing of the door, this actuating means is preferably applied to the lower portion of the free or swinging edge of the door and operatively connected to the sealing means to cause upward swinging of the carrier plate upon opening of the door and downward swinging of the carrier plate upon closing of the door. Secured to the inner face of the door A above one end of the carrier strip 10 is an angle-shaped pivot bracket 13 which may be secured to the door by screws 14. Pivoted at one corner to the projecting portion of the bracket 13 as upon the pivot pin 15, is a bell crank lever 16 in the form of a triangular-shaped plate adapted for vertical swinging movement upon the pivot 15. Pivotally connected at one end as upon the pivot pin 17 to the lower end of the lever 16 is a link 18 for connection to the hinged carrier strip 10.

An upper end portion of the carrier strip 10 is cut and bent outwardly at a right angle to provide a coupling portion 19 and this coupling portion is provided with a series of adjustment openings 20. A removable coupling pin 21 adjustably connects one end of the link 18 with the coupling portion 19 and this pin may be inserted in either of the adjustment openings 20 to adjust the tension on the sealing strip 12 when closed against the door.

Extended thru the door above the bracket 13 is a guide sleeve 22 in which is reciprocally guided a plunger bolt 23, the ends of which project beyond opposite faces of the door. The plunger bolt 23 is preferably formed with a head portion 24 having a sliding fit in the sleeve 22 and a reduced stem portion 25 which is slotted at its outer end and provided with adjustment openings 26. A bushing 27 is secured in one end of the sleeve 22 and provides a slide bearing for the stem 25.

Pivotally connected at one end as at 28 to the upper end of the lever 16 is a link 29 having its opposite end extended into the slotted end of the stem 25 and adjustably secured thereto as by a cotter pin or the like 30 extended thru the adjustment openings 26. The adjustment openings 26 allow for mounting of the strip actuating means upon doors of different thicknesses and in the example shown the device is mounted upon a door of minimum thickness.

Secured to the face of the jamb 5 at the free or swinging edge of the door to be engaged by the head 24 of the plunger bolt 23, is a preferably metal contact block 31. As the door is closed, the plunger thru striking this block 31 is forced thru the sleeve 22 and thru the link 29, lever 16 and link 18 swings the carrier plate 10 downwardly and toward the door thus bringing the sealing strip 12 into contact with the door and also against the sill 8.

Connected between the upper portion of the lever 16 and the upper portion of the bracket 13 is a contractile coil spring 32 which tends to normally swing the upper end of the lever toward the door and the lower end of the lever away from the door to draw the sealing strip out of contact with the door when the door is opened. Encircling the stem portion 25 of the plunger bolt within the guide sleeve 22 with one end acting upon the bearing 27 and its opposite end acting upon the bolt head 24 is an expansion coil spring 33 which acts to normally project the head 24 and exert a pull upon the link 29. This coil spring 33 aside from assisting in raising the sealing strip, is to elminate possible binding of the stem portion 25 by the action of the spring 32 exerting a pushing force upon the stem. Because of the pivotal connection between the link 29 and the stem 25, a lateral pressure will be exerted upon the stem.

Referring particularly to Figures 5 and 6, the flexible sealing strip 12 is adjustably secured to the inner face of the carrier strip 10 so as to be raised or lowered at points thruout its length to follow the contour of the floor or sill beneath the door when closed. Extending thru the lower portion of the metal carrier strip 10 at spaced points thruout the length thereof is a suitable number of combined adjusting and securing elements 35 preferably in the form of round headed cap screws having their threaded shanks extended thru adjusting slots 36 formed at spaced intervals along the length of the sealing strip. The adjusting slots 36 extend in a direction transversely of the sealing strip and permit adjustment of the sealing strip transversely of the carrier strip. Threaded upon the shank of each adjusting screw 35, is a nut 37 for retaining the sealing strip in adjusted position. This adjustable securing of the sealing strip upon the carrier strip permits raising or lowering of the sealing strip at various points thruout its length so as to contact with an uneven floor or sill.

Extended along the inner or sealing face of the sealing strip 12 is a retainer 38 which may consist of a length of wire of suitable gauge coiled as at 39 about the shank of each of the adjusting screws 35. The coils 39 provide washers to be engaged by the nuts 37 and this retaining wire prevents the flexible sealing strip from slipping off over the nuts 37. The retaining wire 38 also serves to hold the material of the sealing strip in firm contact with the inner face of the carrier strip 10 at points between the adjusting screws so that a perfect seal is formed between the sealing strip and carrier strip. The ends of the retaining wire 38 terminate just short of the ends of the sealing strip 12 to prevent marring of the door frame during operation of the weather strip.

In the modification shown in Figure 7, a thin metal retainer strip 40 has been substituted for the wire retainer 38 shown in Figure 6.

When the door is in a closed position as in Figures 1 and 2, the flexible sealing strip contacts the face of the door so that no space is left between the door and strip permitting passage of air downwardly between the sealing strip and door. The sealing strip is of slightly greater length than the width of the door so that no air space is left between the ends of the sealing strip and the door frame when the door is closed. By observing Figures 2 and 3, it will be seen that the sealing strip swings downwardly to a sealing position just prior to final closing movement of the door and is raised upon slight opening movement of the door from a closed position. With this arrangement there will be practically no rubbing of the sealing strip upon the floor and the sealing strip is permitted to pass over rugs or carpets over which the door swings during opening and closing.

Thus it will be seen that the improved automatic weather strip operable by opening and closing of the door acts to effectively seal all openings along the lower portion of the door and embodies adjustable features whereby the sealing strip may be adjusted into contact with uneven floors or sills upon which the sealing strip closes.

Changes in details may be made to the form of invention herein shown and described, without departing from the spirit of the invention or the scope of the following claims.

I claim:

1. In combination with a door, a weather strip hinged along its upper edge to the lower portion of one face of the door, and actuating means for the weather strip embodying a sleeve extended thru the door, a plunger reciprocally guided in the sleeve to project beyond opposite faces of the door, a lever pivoted intermediate its ends upon the door, a link connecting the upper end of the lever and plunger, a link connecting the lower end of the lever and the weather strip, spring means within the sleeve for returning the plunger and raising the weather strip upon opening of the door, and a contact block engageable by the plunger when the door is closed for swinging the weather strip into sealing position against the door and threshold.

2. In combination with a door, a weather strip hinged along one edge to the lower portion of the door, and means for swinging the weather strip into sealing position upon closing of the door comprising a bracket secured to the door, a lever pivoted intermediate its ends upon the bracket, a link connecting the lower end of the lever and the weather strip, a guide sleeve extending thru the door above the bracket, a plunger reciprocally guided in the guide sleeve to project beyond opposite faces of the door, a link connecting the upper end of said lever and the plunger, spring means within the guide sleeve for swinging the weather strip out of sealing position upon opening of the door, and a stop block carried by the door frame to be engaged by one end of the plunger upon closing of the door for swinging the weather strip into sealing position.

3. In combination with a door, a weather strip hinged along one edge to the lower portion of the door and provided with an out-turned coupling portion having a series of adjustment openings therein, a lever pivoted intermediate its ends upon the door, a link pivotally connected at one end to the lower end of the lever, means adjustably connecting the opposite end of the link to the weather strip at a selected opening of the series of openings in the out-turned coupling portion for varying the tension on the weather strip, a plunger reciprocally movable thru the door and provided at one end with a plurality of adjustment openings, a link pivotally connected at one end to the upper end of said lever, means adjustably connecting the opposite end of said last mentioned link to the end of the plunger at a selected opening therein to compensate for doors of different thicknesses, a stop block engageable by the opposite end of the plunger upon closing of the door for swinging the weather strip into sealing position, and spring means for returning the plunger and swinging the weather strip out of sealing position upon opening of the door.

4. A weather strip for doors comprising a carrier strip, a sealing strip extending along one face of the carrier strip and provided at spaced points along its length with transverse adjustment slots, cap screws extending thru the carrier plate and projecting thru said slots, a retaining wire extending along the inner face of the sealing strip and provided with coils thru which said screws project, and a nut threaded upon each of said screws.

5. A weather strip comprising a carrier strip, cap screws extending thru the carrier strip, a flexible sealing strip extended along the inner face of the carrier strip and provided with openings receiving the shanks of said cap screws, a narrow metal retainer extending longitudinally of the inner face of the sealing strip and having openings receiving the shanks of said cap screws, and a nut threaded on each cap screw for drawing the retainer into the sealing strip along a line intermediate the upper and lower edges of the sealing strip.

RICHARD G. HAZZARD.